United States Patent [19]
Giebel et al.

[11] Patent Number: 6,149,313
[45] Date of Patent: Nov. 21, 2000

[54] GENDER SELECTABLE FIBER OPTIC CONNECTOR AND ASSOCIATED FABRICATION METHOD

[75] Inventors: Markus A. Giebel; James P. Luther; Joel C. Rosson, all of Hickory, N.C.

[73] Assignee: Siecor Operations, LLC, Hickory, N.C.

[21] Appl. No.: 09/223,908

[22] Filed: Dec. 31, 1998

[51] Int. Cl.⁷ ........................................................ G02B 6/38
[52] U.S. Cl. ................................ 385/59; 385/53; 385/56; 385/58
[58] Field of Search ........................... 385/53–56, 58–60, 385/62–63, 65–73, 78, 81, 83–86

[56] References Cited

U.S. PATENT DOCUMENTS

| | | | |
|---|---|---|---|
| 4,907,852 | 3/1990 | Noba et al. | 385/58 |
| 5,093,881 | 3/1992 | Bortolin et al. | 385/114 |
| 5,214,730 | 5/1993 | Nagasawa et al. | 385/59 |
| 5,519,799 | 5/1996 | Murakami et al. | 385/78 |
| 5,727,101 | 3/1998 | Giebel et al. | 385/59 |
| 5,727,102 | 3/1998 | Jeong et al. | 385/59 |
| 5,940,561 | 8/1999 | Dean, Jr. et al. | 385/60 |

FOREIGN PATENT DOCUMENTS

| | | |
|---|---|---|
| 0105589A1 | 4/1984 | European Pat. Off. . |
| 0819960A2 | 1/1998 | European Pat. Off. . |

Primary Examiner—Thong Nguyen

[57] ABSTRACT

A gender selectable fiber optic connector is provided which can be readily converted between male and female configurations following assembly and polishing of the connector. The gender selectable fiber optic connector includes a housing, a ferrule operably connected to the housing such that a forward portion of the ferrule extends beyond the housing, and a shroud adapted to be mounted upon the forward portion of the ferrule such that the forward portion of the ferrule extends through a passageway defined by the shroud. In order to alter the gender of the fiber optic connector, the shroud has both male and female configurations. In this regard, the male configuration of the shroud includes at least one guide pin extending lengthwise through the passageway defined by the shroud for engaging a lengthwise extending alignment groove defined by the ferrule in order to produce a male fiber optic connector. In contrast, the female configuration of the shroud is free of guide pins such that mounting the female configuration of the shroud upon the ferrule produces a female fiber optic connector. In addition to the gender selectable fiber optic connector and the associated shroud, a method of fabricating the gender selectable fiber optic connector is provided. Moreover, an outlet assembly is also provided for receiving a fiber optic connector having a rectangular shape in lateral cross-section, such as an MT connector or the gender selectable fiber optic connector having a rectangularly-shaped shroud, and for precisely aligning the rectangularly-shaped fiber optic connector with a substantially cylindrical ferrule, such as a DC or QC ferrule, so as to increase the flexibility with which different types of ferrules can be interconnected as well as the precision of the resulting interconnection.

16 Claims, 6 Drawing Sheets

GENDER SELECTABLE FIBER OPTIC CONNECTOR AND ASSOCIATED FABRICATION METHOD

FIELD OF THE INVENTION

The present invention relates generally to fiber optic connectors and associated fabrication methods and, more particularly, to multi-fiber connectors having male and female configurations and associated fabrication methods.

BACKGROUND OF THE INVENTION

Multi-fiber cables or ribbons are being increasingly employed in a wide variety of applications. As such, several standard multi-fiber connectors have been developed and are commonly employed. Perhaps one of the most common multi-fiber connectors is the MT RJ connector having a rectangularly-shaped MT ferrule developed by Nippon Telegraph & Telephone Corporation of Tokyo, Japan. However, another common multi-fiber connector is the SC DC connector having a substantially cylindrical DC ferrule developed by Siecor Corporation of Hickory, N.C.

Since the SC DC connector does not include guide pins that would extend beyond the end surface of the DC ferrule, the SC DC connector can be advantageously assembled prior to polishing the end surface of the DC ferrule. In this regard, the post-assembly polishing of an SC DC connector is facilitated by the accessibility of the cylindrical exterior surface of the DC ferrule which is formed to within extremely tight tolerances and which serves as a polishing datum or point of reference during polishing operations.

In contrast to the SC DC connector, which has a single configuration, the MT RJ connector has two configurations, namely, a male configuration, which includes a pair of guide pins extending outwardly beyond the forward end of the MT ferrule, and a female configuration, which does not include guide pins but defines a pair of guide pin holes. As known to those skilled in the art, the two configurations are necessary since in order to mate a pair of MT RJ connectors, the guide pins of a male MT RJ connector are inserted into the guide pin holes of a female MT RJ connector. In order to retain the guide pins in the male configuration of the MT RJ connector, each MT RJ connector generally includes a pin keeper. The pin keeper is typically positioned immediately rearward of the MT ferrule within the connector housing such that the guide pins extend through the guide pin holes defined by the MT ferrule and outwardly beyond the forward end of the MT ferrule. Thus, the guide pins of the male configuration of an MT RJ connector must be inserted during the factory assembly process and cannot be inserted in the field once the remainder of the MT RJ connector has been assembled. As a result, the female configuration of an MT RJ connector cannot be converted to a male configuration in the field by merely inserting guide pins through the guide pins holes defined by the MT ferrule since the guide pins will not be appropriately grasped by the pin keeper. Field technicians must therefore maintain an inventory of MT RJ connectors in both the male configuration and the female configuration since the MT RJ connectors cannot be converted or otherwise altered in the field.

Additionally, the end surface of an MT ferrule must be polished prior to assembling the MT RJ connector since the shoulder defined by the enlarged rear portion of the MT ferrule is used as a point of reference during the polishing process and is inaccessible once the MT RJ connector, including the connector housing and the other components, has been assembled. With respect to the male configuration of the MT RJ connector, the insertion of the guide pins through the guide pin holes defined by the MT ferrule during the assembly process would also serve to prevent the forward end of the MT ferrule from being polished following the assembly process since the guide pins would extend therebeyond. Since the forward end of the MT ferrule is polished prior to the assembly process, the assembly process must be carefully monitored to prevent inadvertent contact or damage to the forward end of the MT ferrule which could damage or otherwise disadvantageously affect the polished surface.

In some applications, MT RJ connectors are inserted into an outlet or other receptacle in order to optically interconnect the optical fibers upon which the MT RJ connector is mounted with other optical fibers or optical components disposed within the outlet or other receptacle. In this regard, conventional outlets that are adapted to receive MT RJ connectors engage the exterior surface of the MT ferrule as the MT RJ connector is inserted into the outlet in order to position the MT ferrule within the outlet. Unfortunately, the exterior surface of an MT ferrule is not as precisely defined with respect to the positions of the optical fibers at the forward end of the ferrule as other features of the MT ferrule, such as the shoulder defined by the enlarged rear portion of the ferrule. In addition, the exterior surface of an MT ferrule has a relatively loose relationship with respect to the locations of the guide pin holes defined by the MT ferrule. Further, the guide pin holes defined by a conventional MT ferrule are generally slightly oversized such that the guide pins that extend therethrough are permitted limited lateral movement with respect to the remainder of the MT ferrule. As such, an MT RJ connector and, more particularly, the optical fibers upon which the MT RJ connector is mounted may not be appropriately aligned with the optical fibers or optical components disposed within the outlet, particularly in instances in which single mode optical fibers must be aligned with great precision. In this same vein, the guide pins of an MT RJ connector inserted into a conventional outlet may be somewhat misaligned relative to the corresponding guide pin holes and may therefore be stubbed and require reinsertion into the outlet in order to properly engage the corresponding guide pin holes.

As described above, several conventional multi-fiber connectors have been designed. Although these multi-fiber connectors are widely employed, a need still exists for a multi-fiber connector that is capable of being converted between male and female configurations in the field in order to reduce the inventory that must be carried by field technicians. In addition, a need exists for a multi-fiber connector that can be assembled prior to polishing and prior to the insertion of guide pins in order to facilitate the fabrication process. Moreover, a need exists for a multi-fiber connector and an associated outlet that provides improved alignment of the multi-fiber connector and, more particularly, the plurality of optical fibers upon which the multi-fiber connector is mounted with the optical fibers or optical components disposed within the outlet.

SUMMARY OF THE INVENTION

According to one advantageous embodiment to the present invention, a gender selectable fiber optic connector is provided that can be readily converted between male and female configurations following assembly and polishing of the connector. For example, the fiber optic connector of the present invention can be converted between male and female configurations in the field such that a technician need not maintain an inventory of two entirely different connector configurations. According to this embodiment, the gender selectable fiber optic connector includes a housing, a ferrule operably connected to the housing such that a forward portion of the ferrule extends beyond the housing, and a shroud adapted to be mounted upon the forward portion of the ferrule such that the forward portion of the ferrule extends through a passageway defined by the shroud. According to the present invention, the shroud can have either a male configuration or a female configuration. In this regard, the male configuration of the shroud includes at least one guide pin extending lengthwise through the passageway defined by the shroud for engaging a lengthwise extending alignment groove defined by the ferrule in order to produce a male fiber optic connector. In contrast, the female configuration of the shroud is free of guide pins such that mounting the female configuration of the shroud upon the ferrule produces a female fiber optic connector.

Advantageously, the shroud of this embodiment need not be mounted upon the ferrule until after: (1) the ferrule and the housing have been assembled, (2) the ferrule has been mounted upon a plurality of optical fibers, and (3) the forward end of the ferrule and the exposed end portions of the optical fibers have been polished. As such, the shroud can be mounted during field installation of the fiber optic connector in order to configure the connector as either a male connector or a female connector.

The shroud typically includes a shroud body defining a lengthwise extending passageway. In one embodiment of the male configuration of the shroud, the shroud also includes at least one guide pin partially embedded within the shroud body and extending lengthwise through the passageway defined by the shroud body such that the guide pin extends beyond at least one end of the shroud body. In the more common embodiment in which the ferrule defines a pair of lengthwise extending grooves, the male configuration of the shroud also includes a pair of guide pins extending lengthwise through the passageway for engaging respective alignment grooves as the shroud is mounted upon the forward portion of the ferrule. Since the alignment grooves defined by the ferrule are generally diametrically opposed, the pair of guide pins of this embodiment also typically extends through diametrically opposed portions of the passageway to permit engagement with respective alignment grooves.

According to another embodiment, the male configuration of the shroud includes a pin carrier adapted to be mounted upon the ferrule proximate the shroud body. For example, the pin carrier can be a carrier ring that encircles the ferrule so as to facilitate mounting of the pin carrier upon the ferrule. The male configuration of the shroud of this embodiment also includes at least one guide pin connected to the pin carrier and extending through the passageway defined by the shroud body. In the more common embodiment in which the ferrule defines a pair of lengthwise extending grooves, the male configuration of this embodiment of the shroud includes a pair of guide pins connected to the pin carrier and extending through the passageway defined by the shroud body so as to engage respective alignment grooves of the ferrule as the shroud is mounted upon the forward portion of the ferrule.

In one advantageous embodiment, the fiber optic connector of the present invention can adapt a ferrule that is typically utilized in conjunction with a first type of fiber optic connector, such as a DC or QC ferrule (a 2 fiber and a 4 fiber ferrule, respectively, from Siecor Corporation), for use or interconnection with a second type of fiber optic connector, such as an MT connector. In this embodiment, the ferrule and the passageway defined by the shroud body both preferably have a substantially circular shape in lateral cross-section. In contrast, at least a portion of the exterior surface of the shroud body preferably has a rectangular shape in lateral cross-section.

In order to fabricate the gender selectable fiber optic connector of the present invention, the ferrule is at least partially mounted within the housing such that a rear portion of the ferrule is disposed within the housing and a forward portion of the ferrule extends beyond the housing. The ferrule is then mounted upon a plurality of optical fibers such that the end portions of the optical fibers are exposed at a forward end of the ferrule. The forward end of the ferrule and the exposed end portions of the fibers are then polished. In this regard, the polishing of the forward end of the ferrule and the exposed end portions of the optical fibers is facilitated since the exterior surface of the ferrule which serves as a polishing datum is readily accessible even after assembly of the ferrule and the housing. As such, the ferrule and the housing can be assembled, the ferrule can be mounted upon the optical fibers and the forward end of the ferrule can be polished during factory assembly of the fiber optic connector. Once in the field, the particular type of shroud, either the male or female configuration, can be selected and mounted upon the ferrule in order to produce a male or female fiber optic connector, respectively. As such, the gender selectable fiber optic connector of the present invention is efficiently fabricated since the connector is assembled prior to polishing the connector, which, in turn, is completed prior to adding guide pins to the male configuration.

In order to further facilitate the mating of the ferrule of a first type of fiber optic connector, such as a DC or QC ferrule, with a second type of fiber optic connector, such as an MT connector, an outlet assembly is also provided for receiving a fiber optic connector having a rectangular shape in lateral cross-section, such as an MT connector or the gender selectable fiber optic connector having a rectangularly-shaped shroud. The outlet assembly includes an outlet housing having a first and second portions. The first portion defines a lengthwise extending passageway adjacent one end of the outlet housing for receiving the rectangularly-shaped fiber optic connector. In contrast, the second portion of the outlet housing defines a substantially circular aperture opening into the passageway defined by the first portion of the outlet housing. The outlet assembly of this embodiment also includes a substantially cylindrical ferrule, such as a DC or QC ferrule, extending through the aperture defined by the second portion of the outlet housing such that the forward end of the ferrule is exposed within the passageway defined by the first portion of the outlet housing. Although the ferrule is substantially cylindrical in lateral cross-section, the exterior surface of the ferrule does define at least one and, more commonly, a pair of lengthwise extending alignment grooves. Accordingly, the outlet of this embodiment also includes at least one and, more typically, a pair of alignment members extending lengthwise through the aperture for engaging the respective alignment grooves defined by the ferrule in order to align the ferrule and the outlet housing. In single mode applications, each alignment member is generally a guide pin extending lengthwise through the aperture for engaging a respective alignment groove defined by the ferrule. In multi-mode applications, however, each alignment member can be an alignment rib that is integral with the second portion of the outlet housing and that extends lengthwise through the aperture for engaging a respective alignment groove.

According to this aspect of the present invention, the passageway defined by the first portion of the outlet housing is adapted to receive a fiber optic connector having a rectangular shape in lateral cross-section. In addition to merely receiving the fiber optic connector, the outlet assembly is adapted to maintain the rectangularly-shaped fiber optic connector in an aligned relationship with the substantially cylindrical ferrule. As such, the rectangularly shaped fiber optic connector, such as an MT connector or the gender selectable fiber optic connector having a rectangularly-shaped shroud, can be plugged into the outlet and mated with a substantially cylindrical ferrule, such as a DC or QC ferrule, thereby increasing the flexibility with which different types of connectors and/or ferrules can be interconnected. Moreover, the alignment accuracy provided by the outlet of this aspect of the present invention is quite high since the alignment member which positions the substantially cylindrical ferrule relative to the rectangularly-shaped fiber optic connector engage the exterior surface of the substantially cylindrical ferrule which serves as the polishing datum and is therefore precisely defined with respect to the positions of the optical fibers at the forward end of the ferrule.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
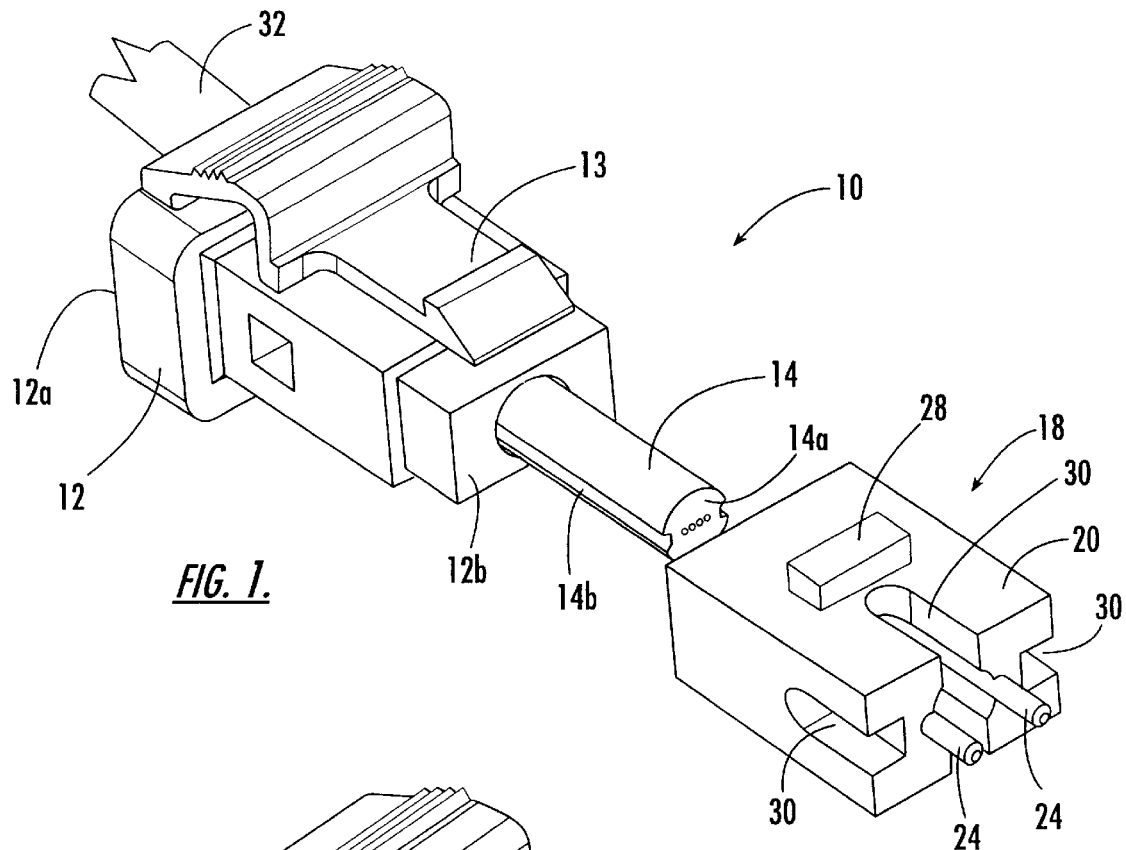
FIG. 1 is an exploded perspective view of a gender selectable fiber optic connector of one embodiment of the present invention that includes a male configuration of the shroud.
Figure 3:
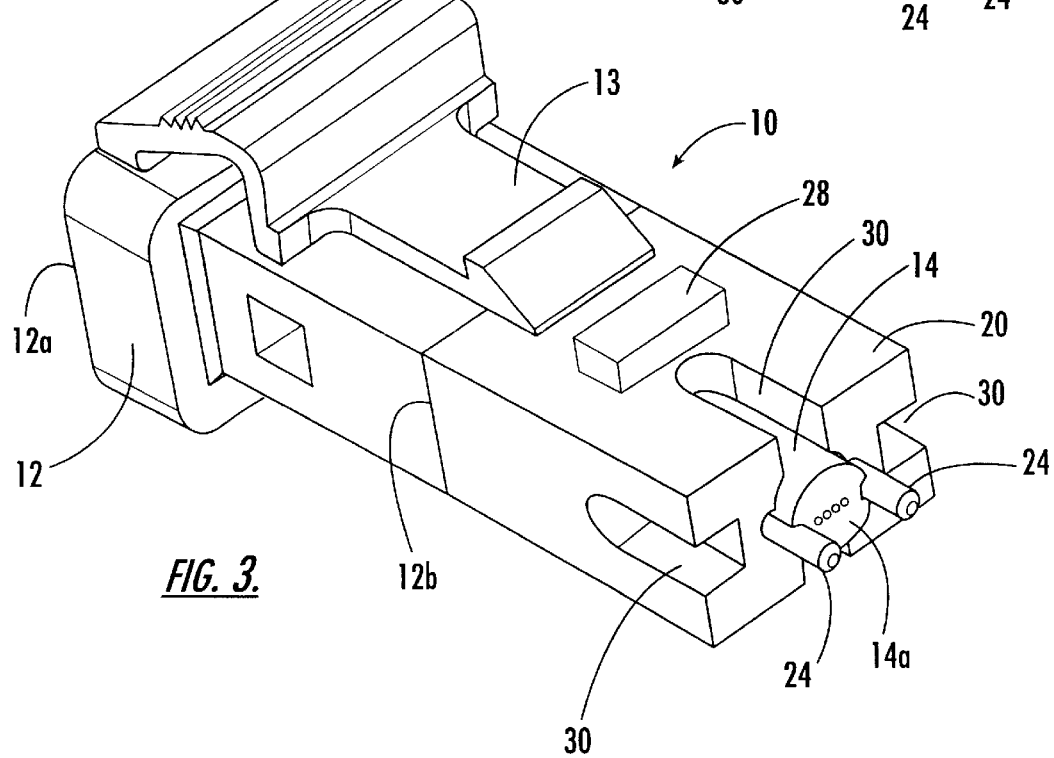
FIG. 3 is a perspective view of the embodiment of the gender selectable fiber optic connector illustrated in FIGS. 1 and 2 following assembly of the connector.
Figure 2:
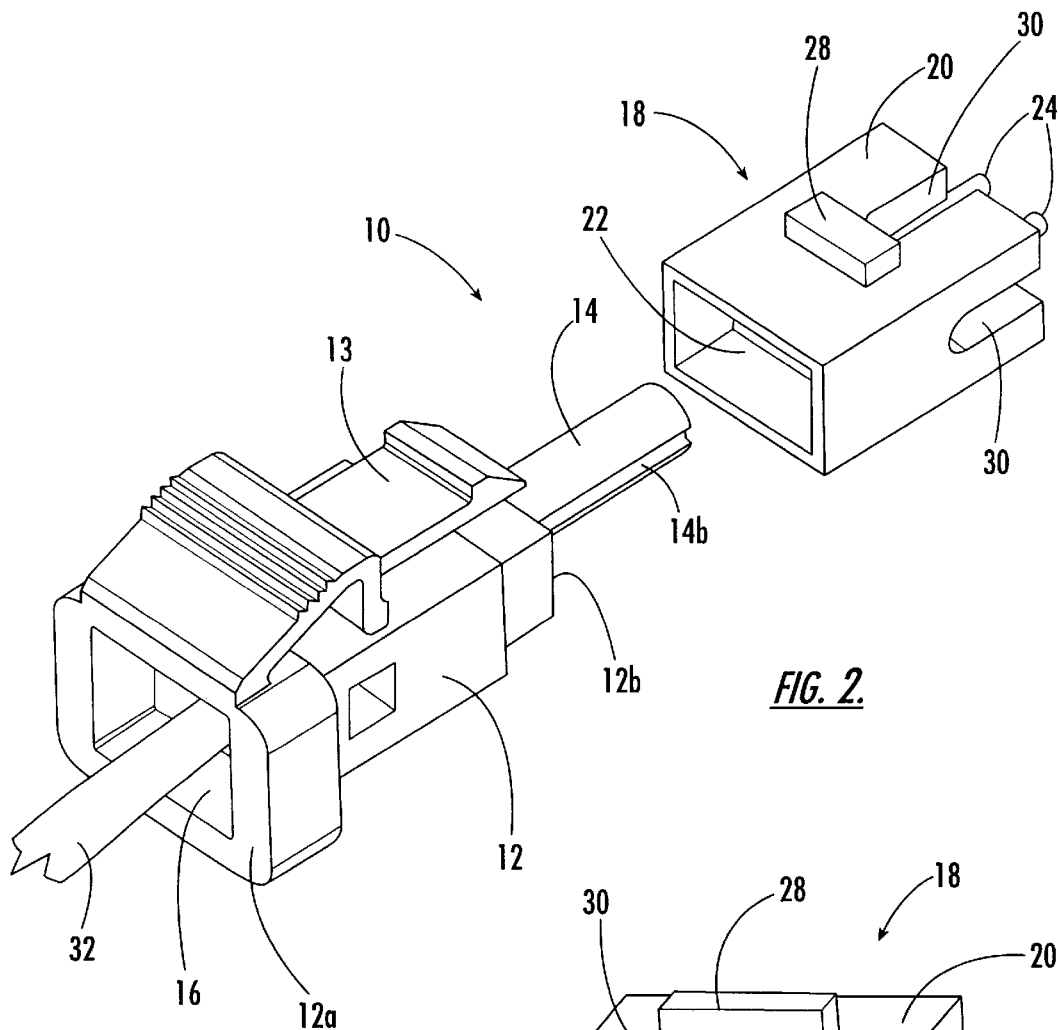
FIG. 2 is an exploded perspective view of the embodiment of the gender selectable fiber optic connector illustrated in FIG. 1 taken from another angle.

Referring now to FIGS. 1 and 2, a gender selectable fiber optic connector 10 according to one embodiment of the present invention is illustrated. The gender selectable fiber optic connector includes a housing 12 and a ferrule 14 operably connected to the housing. As shown more clearly in FIG. 2, the housing is generally formed of a plastic material so as to define a lengthwise extending passageway 16 having a cross-sectional size which decreases from the rear end 12a of the housing toward the front end 12b of the housing, typically in a step-wise fashion. Although not necessary for the practice of the present invention, the housing also includes a latch 13, such as an RJ latch depicted in the illustrated embodiment, for mechanically engaging an alignment sleeve, outlet or other receptacle, as described in more detail hereinbelow.

In single mode applications, the ferrule 14 is typically formed of heavy glass filled thermoset materials, while, in multi-mode applications, the ferrule is typically formed of heavy glass filled thermoplastic materials. Although the gender selectable fiber optic connector 10 of the present invention can include a variety of ferrules, the ferrule of one advantageous embodiment is a multi-fiber ferrule that has a substantially cylindrical shape, such as a DC or QC ferrule. For example, the ferrule typically has an enlarged rear portion and an elongate, substantially cylindrical forward portion. In order to assemble the ferrule and the housing 12, the ferrule is inserted through the rear end 12a of the housing such that the forward portion of the ferrule extends through an opening defined by the front end 12b of the housing and outwardly beyond the housing, while the enlarged rear portion of the ferrule is retained within the housing.

As shown in FIGS. 1 and 2, the forward portion of the ferrule 14 also preferably defines at least one and, more typically, a pair of lengthwise extending grooves 14b opening outwardly through the exterior surface of the ferrule. In those embodiments in which the ferrule defines a pair of lengthwise extending alignment grooves, the alignment grooves typically extend lengthwise along diametrically opposed sides of the ferrule. However, the ferrule can define alignment grooves that are positioned differently and can define different numbers of alignment groove if so desired.

Figure 5:
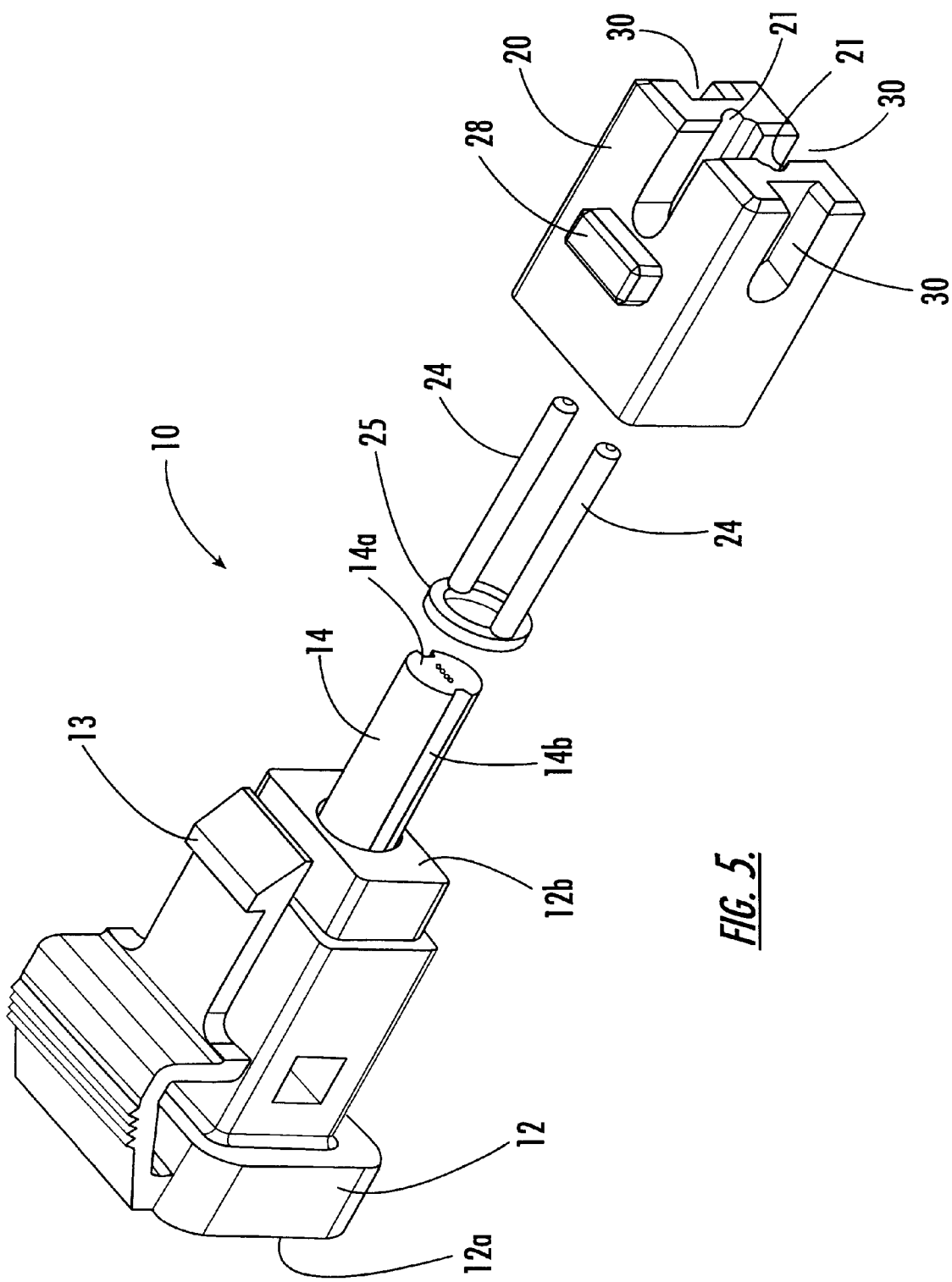
FIG. 5 is an exploded perspective view of a gender selectable fiber optic connector having a male configuration of a shroud according to another embodiment of the present invention.
Figure 6:
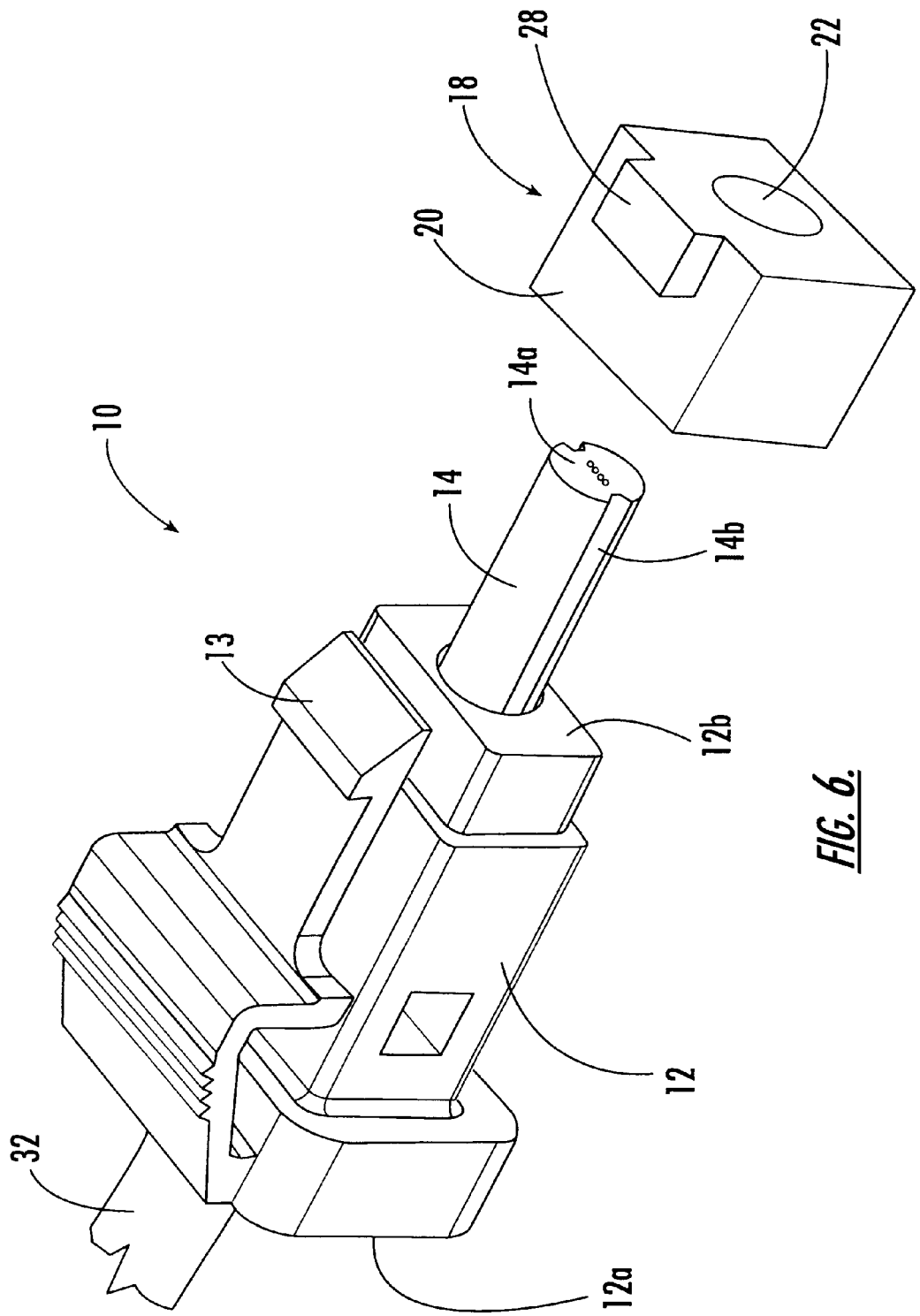
FIG. 6 is an exploded perspective view of a gender selectable fiber optic connector of one embodiment of the present invention that includes a female configuration of the shroud.

The gender selectable fiber optic connector 10 of the present invention also includes a shroud 18. As explained hereinafter, the shroud has either a male configuration as shown in FIGS. 1–5 or a female configuration as shown in FIG. 6. In either configuration, the shroud includes a shroud body 20 that is typically formed of plastic and defines a lengthwise extending passageway 22. The shroud is adapted to be mounted upon the forward portion of the ferrule 14 such that the forward portion of the ferrule extends through the passageway defined by the shroud body. See FIG. 3. The shroud is also adapted to be operably connected, such as by mechanical engagement, to the housing 12. In the embodiment illustrated in FIG. 2, for example, the rear portion of the passageway defined by the shroud body is sized and shaped to snugly receive the front end 12b of the housing. As a result, the shroud body can be operably connected to the housing by means of frictional engagement of the front end of the housing within the rear portion of the passageway defined by the shroud body. Alternatively, the shroud and/or the housing can include various latch mechanisms for mechanically engaging the shroud body and the housing. Still further, other techniques, such as an adhesive or the like, can be employed to couple the shroud body and the housing.

In the illustrated embodiment in which the shroud body 20 is designed to be mounted upon and frictionally engage the front end 12b of the housing 12, the rear portion of the passageway 22 defined by the housing preferably has a shape and size that corresponds to the shape and size of the front end of the housing. However, the forward portion of the passageway defined by the shroud 18 preferably has a shape and size that corresponds to the shape and size of the forward portion of the ferrule 14 which is inserted therethrough. In one advantageous embodiment in which the ferrule is substantially cylindrical, the forward portion of the passageway defined by the shroud body is also generally cylindrical and is sized to snugly receive the forward portion of the ferrule. However, the ferrule could have other cross-sectional shapes (e.g., oval, rectangular, square, etc.) with a corresponding shroud body.

The shroud 18 can be formed in either male or female configurations. As shown in FIGS. 1–5, the male configuration of the shroud also includes at least one guide pin 24 extending lengthwise through the passageway 22 defined by the shroud body 20 for engaging a respective alignment groove 14b defined by the ferrule 14 to therefore produce a male fiber optic connector 10. See FIG. 3. Preferably, the shroud includes the same number of guide pins as alignment grooves defined by the ferrule. Since the ferrule defines a pair of diametrically opposed alignment grooves, the shroud also generally includes a pair of guide pins extending lengthwise along diametrically opposed portions of the passageway defined by the shroud body.

Figure 4:
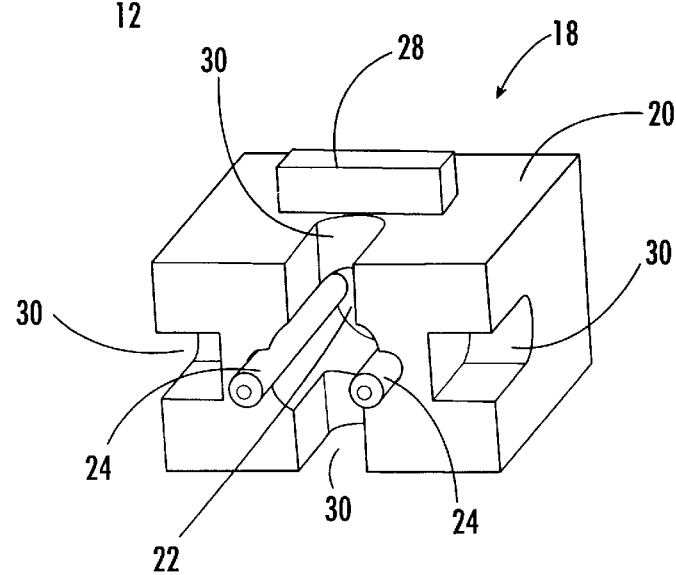
FIG. 4 is a perspective view of a male configuration of a shroud according to one embodiment of the present invention.

In one embodiment that is best illustrated in FIG. 4, the guide pins 24 are partially embedded within the shroud body 20 so as to extend lengthwise through the passageway 22 and outwardly beyond at least one end of the shroud body, that is, beyond the forward end of the shroud body. While the guide pins generally extend beyond the forward end of the shroud body, the guide pins preferably do not extend beyond the rear end of the shroud body so as not to interfere with the mounting of the shroud body upon the front end 12b of the housing 12. Although the guide pins can be embedded to different depths within the shroud body, the guide pins of one embodiment are embedded to a depth that is approximately equal to the radius of the guide pins, such that about one-half of each guide pin is embedded within the shroud body and about one-half of each guide pin extends into the passageway defined by the shroud body. Preferably, the portion of each guide pin which extends into the passageway defined by the shroud body is approximately equal in size and shape of the respective alignment groove 14b defined by the ferrule 14 such that the guide pins will be snugly received within the respective alignment grooves.

Although the guide pins 24 can be embedded within the shroud body 20 in a variety of manners, the shroud body of one embodiment is injection molded. As such, the mold can be designed to receive and hold the guide pins such that the shroud body can be injection molded around the guide pins. Alternatively, the mold can define a pair of grooves extending lengthwise through the forward portion of the passageway 22 defined by the shroud body. After removing the shroud body from the mold of this alternate embodiment, the guide pins can be inserted into respective grooves and secured by means of an adhesive or the like. Similarly, the shroud body 20 and guide pins 24 can be a monolithic piece, the guide pins having been injection molded with the remainder of the shroud body 20.

Although the male configuration of the shroud 18 illustrated in FIGS. 1–4 and described above can be reliably mounted upon the front end 12b of the housing 12 in order to create a male connector 10, the male configuration of the shroud can be constructed in a variety of other manners without departing from the spirit and scope of the present invention. As shown in FIG. 5, for example, the male configuration of the shroud can include multiple components that are assembled upon the forward portion of the ferrule 14 in order to appropriately configure the connector. In this regard, in addition to defining a lengthwise extending passageway, the shroud body 20 can define at least one and, more commonly, a pair of alignment grooves 21 that extend lengthwise through the shroud body and which open into the passageway defined thereby. Upon mounting the shroud body upon the ferrule, the alignment grooves defined by the shroud body therefore cooperate with the alignment grooves defined by the ferrule to create guide pin openings extending lengthwise along opposite sides of the ferrule. The shroud of this embodiment also includes a pin carrier 25 adapted to be mounted upon said ferrule proximate the shroud body. As illustrated, the pin carrier can be embodied as a carrier ring that is preferably sized so as to snugly encircle the ferrule. As shown in FIG. 5, the shroud further includes at least one and, more commonly, a pair of guide pins 24 connected to the pin carrier and extending through the passageway defined by the shroud body. More particularly, the guide pins generally extend outwardly from the pin carrier so as to extend through the guide pin openings defined by the respective alignment grooves of the shroud body and the ferrule.

Upon mounting either embodiment of the male configuration of the shroud 18 upon the forward portion of the ferrule 14, the guide pins 24 will engage respective alignment grooves 14b defined by the ferrule in order to align the shroud and the ferrule. In addition, the shroud body 20 will engage the front end 12b of the housing 12 in order to mechanically couple the shroud and the housing. As such, a male fiber optic connector 10 can be produced in which the forward end of the ferrule and the guide pins extend beyond the shroud body. In the embodiments illustrated in FIGS. 1–5, the ferrule and the passageway 22 defined by the shroud body are substantially cylindrical so as to have a substantially circular shape in lateral cross-section. In contrast, at least a portion of the exterior surface of the shroud body of these embodiment has a rectangular shape in lateral cross-section. As such, the shroud of these embodiments of the present invention can be used on a first type of fiber optic connector, such as a DC ferrule secured in a rectangularly shaped housing rather than a square housing of the SC-DC connector, that is to be mated with a second type of fiber optic connector, such as an MT connector, thereby increasing the flexibility and accuracy with which different types of connectors and/or ferrules can be mated.

As illustrated, the shroud 18 can also include various alignment features for aligning the resulting fiber optic connector 10 with another fiber optic connector or with an alignment sleeve, an outlet or other receptacle. In this regard, the shroud body 20 can include an outwardly extending alignment key 28 and the forward end of the shroud body can define several cut-outs 30 that are sized and shaped to mate with corresponding features within an alignment sleeve, an outlet or other receptacle. For example, the alignment key and cut-out portions of the shroud bodies illustrated in FIGS. 1–5 are adapted to engage corresponding alignment features within a conventional sleeve, outlet or receptacle that has been designed to receive MT connectors. However, the shroud can include other alignment features, if so desired, without departing from the spirit and scope of the present invention.

As shown in FIG. 6, the gender selectable fiber optic connector 10 of the present invention also includes a female configuration of the shroud 18 which, unlike the male configuration of the shroud, does not include guide pins 24. However, the female configuration of the shroud does include a shroud body 20 having the same general size and external shape as the shroud body of the male configuration. In this regard, the shroud body of the female configuration defines a lengthwise extending passageway 22 having a rear portion that is sized and shaped to be mounted upon the front end 12b of the housing 12 and a forward portion through which the forward portion of the ferrule 14 extends. In contrast to the forward portion of the passageway defined by the male configuration of the shroud, however, the forward portion of the passageway defined by the female configuration of the shroud can be a smooth-walled, cylindrical passageway since the shroud does not include guide pins.

Although not illustrated, the passageway 22 defined by the female configuration of the shroud body 18 can include one or more lengthwise extending grooves opening into the passageway at locations corresponding to the relative locations of the alignment grooves 14b defined by the ferrule 14. As such, the grooves defined by the ferrule and the shroud body can cooperate to define substantially cylindrical holes once the ferrule is inserted through the passageway defined by the shroud body. The resulting female fiber optic connector can therefore be aligned with a male fiber optic connector by inserting the guide pins of the male fiber optic connector into respective ones of the holes defined by the female fiber optic connector of this embodiment. Alternatively, the passageway defined by the forward portion of the shroud body can include lengthwise extending alignment ribs that extend into the passageway at locations corresponding to the relative locations of the alignment grooves defined by the ferrule. As such, the alignment ribs can engage corresponding alignment grooves defined by the ferrule as the ferrule is inserted into the passageway defined by the shroud body, thereby aligning the shroud body and the ferrule.

As described above in conjunction with the male configuration of the shroud 18, the female configuration of the shroud body 20 can also include various alignment features. For example, the female configuration of the shroud body can include an alignment key 28 and can define cut-out portions 30 in order to align the resulting female fiber optic connector within an alignment sleeve, outlet or other receptacle.

In order to fabricate the gender selectable fiber optic connector 10 of the present invention, the multi-fiber ferrule 14 is initially mounted at least partially within the housing 12. In this regard, the ferrule is mounted at least partially within the housing such that the enlarged rear portion of the ferrule is disposed within the housing while the forward portion of the ferrule extends through an opening defined by the front end 12b of the housing and outwardly beyond the housing. Thereafter, the ferrule is mounted upon a plurality of optical fibers 32 such that the end portions of the optical fibers are exposed through the forward end 14a of the ferrule.

After the various components of the fiber optic connector 10 have been assembled, the forward end 14a of the ferrule 14 and the exposed end portions of the optical fibers 32 are thereafter polished. According to this aspect of the present invention, the polishing can be conducted after assembling the ferrule and the housing 12 for at least two reasons. First the polishing datum or point of reference during polishing operations is generally accessible even after the ferrule and the housing have been assembled since the cylindrical exterior surface of the forward portion of the ferrule which serves as the polishing datum extends beyond the housing and is exposed following the assembly process. Secondly, the forward end of the ferrule and the exposed end portions of the optical fibers can be polished following assembly of the ferrule and the housing since the fiber optic connector does not yet include guide pins 24 which would generally extend beyond the forward end of the ferrule so as to obstruct polishing operations.

After polishing the forward end 14a of the ferrule 14 and the exposed end portions of the optical fibers 32, a shroud 18 having either a male configuration or a female configuration is selected and is thereafter mounted upon the ferrule. Since the shroud is not mounted upon the ferrule until after the assembly and polishing operations are complete, the shroud can be selectively mounted upon the ferrule during field installation of the fiber optic connector 10. As such, both male and female fiber optic connectors need not be assembled in the factory and maintained in inventory. Instead, the ferrule and the housing 12 can be assembled and, in some instances, the ferrule and the end portions of the optical fibers can be polished during factory assembly. A technician can therefore maintain an inventory of the generic ferrule and housing subassemblies as well as male and female configurations of the shroud that can be mounted upon the ferrule in the field once the technician has determined the particular installation requirements.

Figure 7:
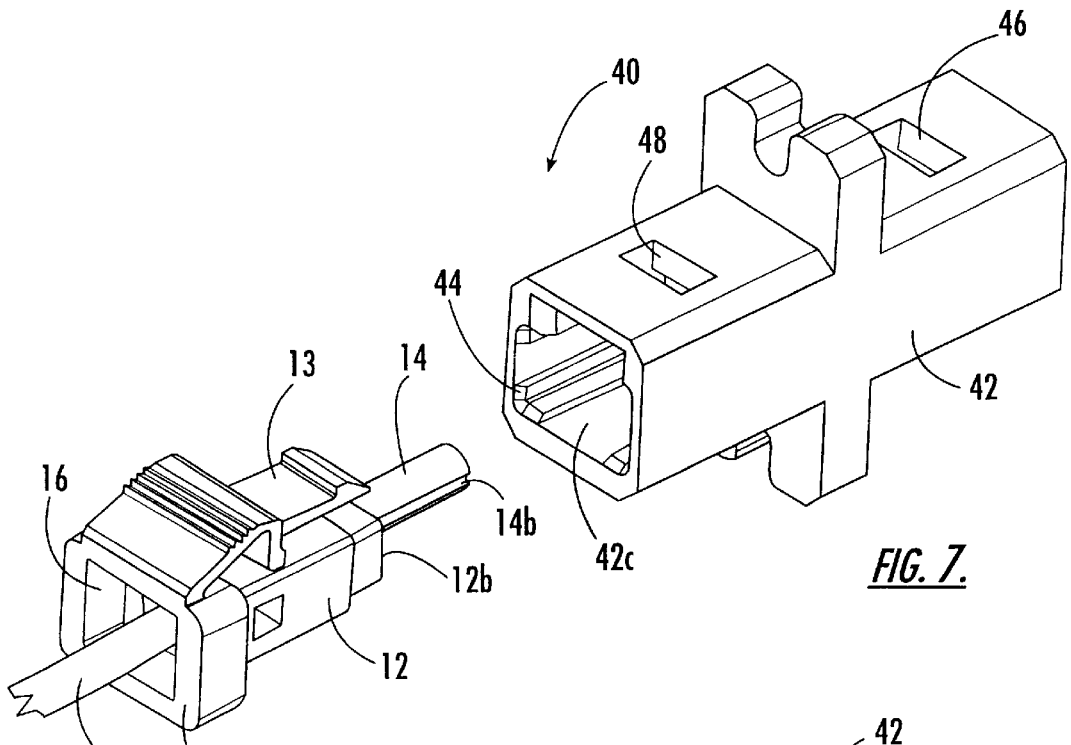
FIG. 7 is an exploded perspective view of an outlet assembly including a connector according to one embodiment of the present invention.

As shown in FIG. 7, an outlet assembly 40 is also provided according to one aspect of the present invention in order to align a substantially cylindrical ferrule 14, such as a DC or QC ferrule, with a fiber optic connector having a rectangular shape in lateral cross-section, such as an MT connector or the gender selectable fiber optic connector 10 having a rectangularly-shaped shroud. As used herein, an outlet assembly is intended to include not only wall outlets, but also other receptacles or alignment sleeves that are adapted to receive a fiber optic connector having a rectangular shape in lateral cross-section.

According to this aspect of the present invention, the outlet assembly 40 includes an outlet housing 42 extending between opposed first and second ends and having a first portion 42a defining a lengthwise extending passageway adjacent the first end of the outlet housing. Since the outlet assembly is generally designed to receive a fiber optic connector having a generally rectangular shape in lateral cross-section, the passageway defined by the first portion of the outlet housing is preferably adapted to receive a fiber optic connector having a generally rectangular shape in lateral cross-section, such as an MT connector or the gender selectable fiber optic connector 10 having a rectangularly-shaped shroud. Although not necessary for the practice of the present invention, the first portion of the outlet housing preferably includes L-shaped corner portions 44 for engaging corresponding corner portions of the fiber optic connector in order to appropriately receive and guide the fiber optic connector into the outlet. In addition, the first portion of the outlet housing also generally includes one or more windows 46 for engaging corresponding latch members of the fiber optic connector in order to mechanically couple the fiber optic connector and the outlet housing. However, the outlet assembly can include other mechanisms for mechanically coupling the outlet housing and the fiber optic connector, if so desired.

Figure 8:
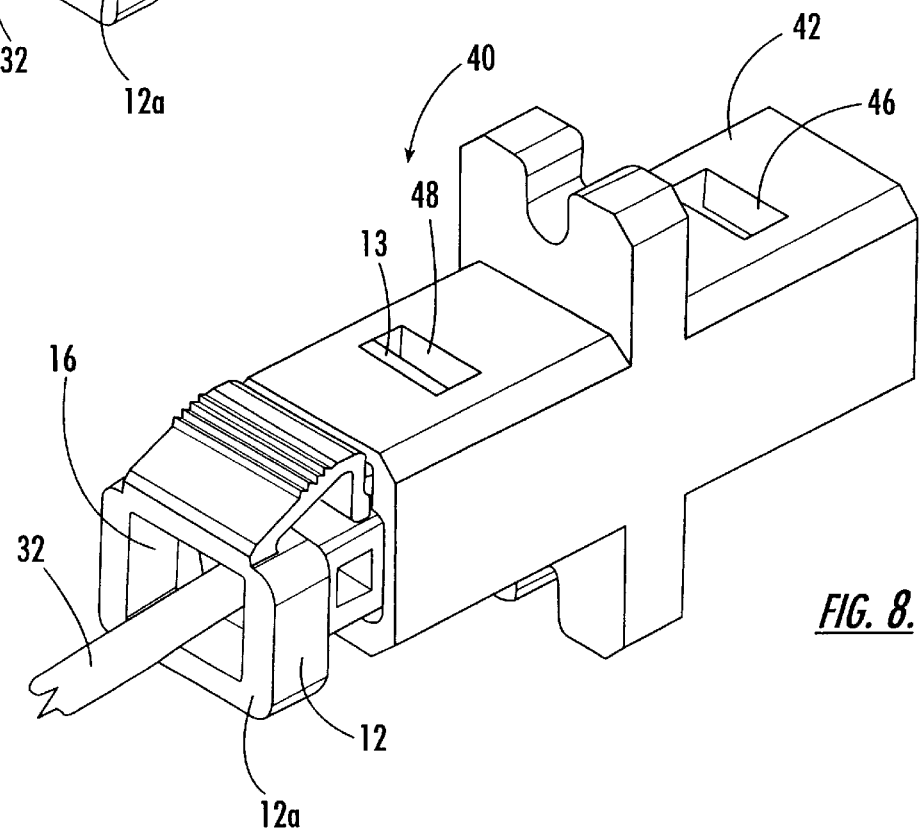
FIG. 8 is a perspective view of the embodiment of the outlet assembly illustrated in FIG. 7 following insertion of the housing and the ferrule into one end of the sleeve.

The outlet housing 42 also includes a second portion 42b that defines a substantially circular aperture opening into the passageway defined by the first portion 42a of the outlet housing. The outlet assembly 40 of this aspect of the present invention also includes a substantially cylindrical ferrule 14, such as a DC or QC ferrule, that extends into the aperture defined by the second portion of the outlet housing such that a forward end 14a of the ferrule is exposed within the passageway defined by the first portion of the outlet housing. As illustrated in FIG. 7 and as described above, the ferrule can be operably connected to a housing 12 such that the forward portion of the ferrule extends outwardly beyond the housing. Although the aperture defined by the second portion of the outlet housing can extend from the passageway defined by the first portion of the outlet housing to the opposed second end of the outlet housing, the outlet housing of one advantageous embodiment further includes a third portion 42c adjacent the second end of the outlet housing which also defines a lengthwise extending passageway for receiving the ferrule and the housing. As shown in FIG. 8, for example, the housing can be inserted into the passageway defined by the third portion of the outlet housing such that the forward portion of the ferrule that extends beyond the housing is inserted into the substantially circular aperture defined by the second portion of the outlet housing. As such, the third portion of the outlet housing preferably defines a passageway having a shape and size corresponding to the shape and size of the housing to be inserted therein. In addition, the third portion of the outlet housing preferably defines a window 48 for engaging the housing latch 13 as the housing is inserted into the passageway. Alternatively, the outlet can include other mechanisms, including frictional or adhesive engagement, for mechanically engaging the ferrule and/or the housing.

Regardless of whether the outlet housing 42 includes a third portion 42c which defines a passageway for receiving and engaging the housing 12, the forward end 14a of the ferrule 14 preferably extends through the substantially circular aperture defined by the second portion 42b of the outlet housing and into the passageway defined by the first portion 42a of the outlet housing. While the ferrule can protrude into the passageway defined by the first portion of the outlet housing by different amounts, the ferrule typically protrudes into the passageway defined by the first portion of the outlet housing by about 0.25 to about 0.5 mm.

As described above and as shown in FIGS. 7 and 10, the ferrule 14 typically defines at least one and, more commonly, a pair of lengthwise extending alignment grooves 14b. Accordingly, the outlet assembly 40 of this aspect of the present invention also preferably includes at least one alignment member 50 extending lengthwise through the aperture for engaging the respective alignment groove defined by the ferrule such that the ferrule and the outlet housing 42 are thereby aligned. Preferably, the outlet assembly includes the same number of alignment members as the number of alignment grooves defined by the ferrule. Since the ferrule typically defines a pair of diametrically opposed alignment grooves, the outlet also typically includes a pair of alignment members positioned in a diametrically opposed relationship and extending lengthwise through the aperture. See FIGS. 9–11.

Figure 10:
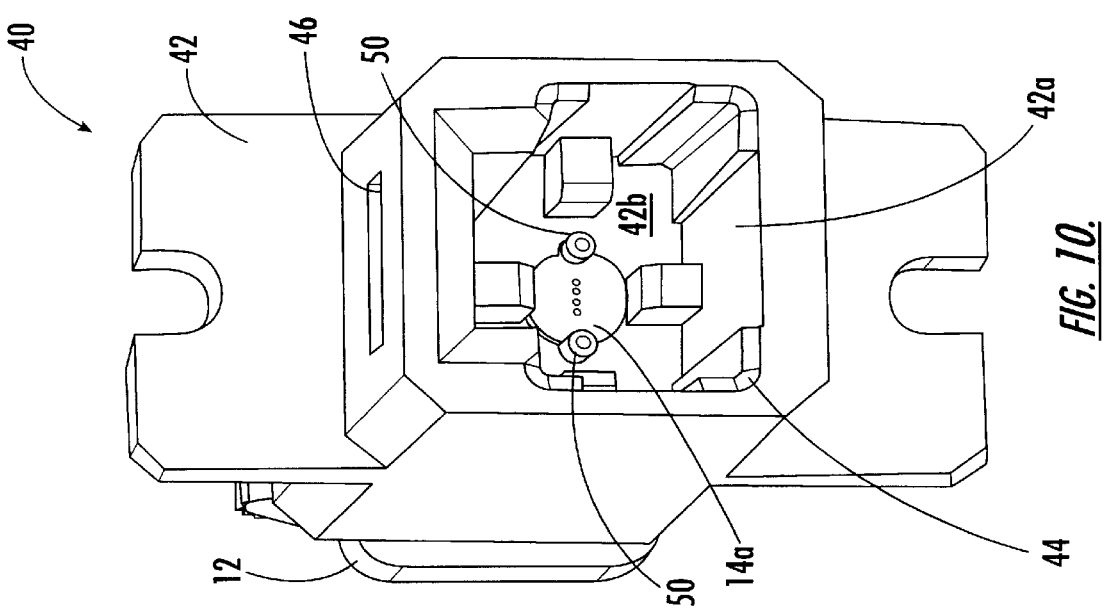
FIG. 10 is a perspective view of the embodiment of the outlet assembly illustrated in FIG. 9 following insertion of a ferrule into the aperture defined by the outlet housing.
Figure 9:
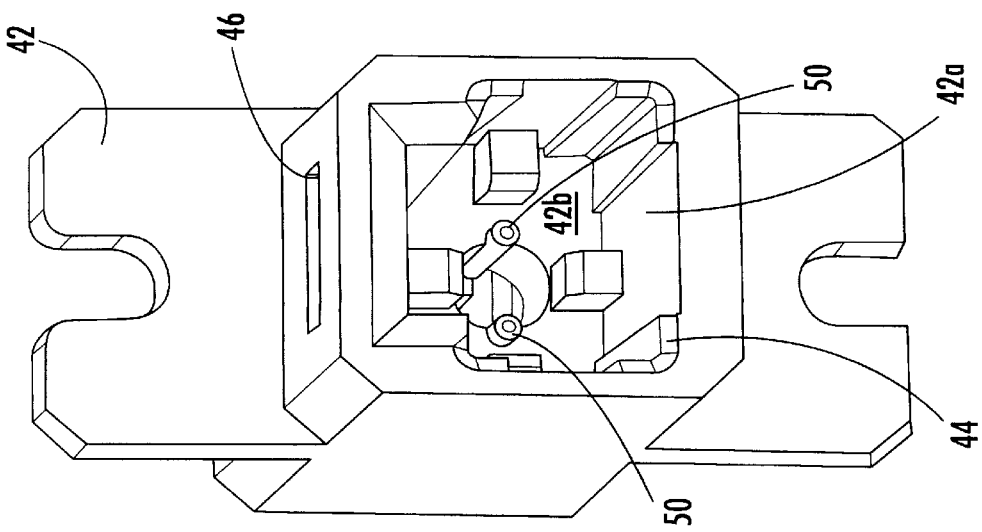
FIG. 9 is a perspective view of an outlet housing according to one embodiment of the present invention prior to insertion of the ferrule that illustrates a pair of guide pins extending lengthwise through the aperture for aligning the ferrule and the outlet housing.

As shown in FIGS. 9 and 10, the alignment members 50 can include guide pins that are at least partially embedded within the outlet housing 42 and, more particularly, within the second portion 42b of the outlet housing. As described above in conjunction with the shroud 18, the guide pins can be embedded within the outlet housing in a variety of manners. For example, the guide pins can be secured, such as by adhesive or the like, in respective grooves which are formed during the molding of the outlet housing so as to extend lengthwise through the aperture. Alternatively, the guide pins can be secured within the mold and the outlet housing can be injection molded around the guide pins. While the guide pins can be embedded at different depths within the outlet housing as also described above in conjunction with the male configuration of the shroud, the guide pins are commonly embedded in the second portion of the outlet housing such that about half of each guide pin is embedded within the outlet housing and about half each guide pin protrudes into the substantially circular aperture. See FIGS. 9 and 10.

Figure 11:
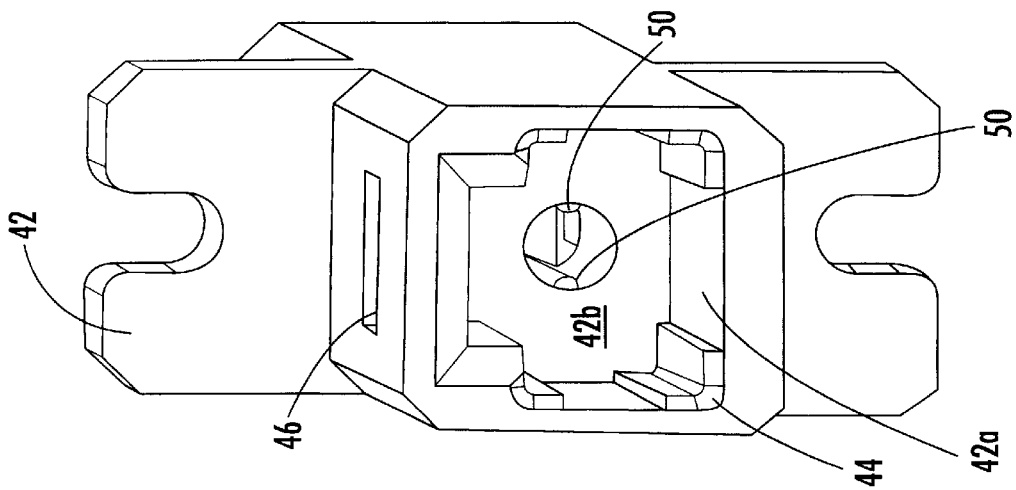
FIG. 11 is a perspective view of an outlet housing according to another embodiment of the present invention prior to insertion of the ferrule which illustrates a pair of integral alignment ribs extending lengthwise through the aperture for aligning the ferrule and the outlet housing.

As shown in FIG. 11, however, the alignment members 50 need not be guide pins. Instead, the alignment members can be alignment ribs that are formed integrally with the outlet housing 42, such as during an injection molding process. As described above in conjunction with the guide pins, the alignment ribs extend lengthwise through the aperture, in order to engage the corresponding alignment grooves 14b defined by the ferrule 14 in order to align the ferrule and the outlet housing. Typically, guide pins are utilized as the alignment members in single mode applications, while alignment ribs are utilized as the alignment members in multi-mode applications.

The outlet assembly 40 of this aspect of the present invention can be mounted, such as within a wall or within the housing of an optical device such as a transceiver, such that the passageway defined by the first portion 42a of the outlet housing 42 opens outwardly in order to receive a fiber optic connector. Prior to insertion of the fiber optic connector, the ferrule 14 has therefore generally already been mounted within the outlet housing such that the forward 14a of the ferrule extends through the substantially circular aperture and protrudes in the passageway defined by the first portion of the outlet housing. As described above, a fiber optic connector having a rectangular shape in lateral cross-section, such as an MT connector or the gender selectable fiber optic connector 10 having a rectangularly-shaped shroud, can then be inserted into the passageway defined by the first portion of the outlet housing which brings the fiber optic connector into an aligned relationship with the substantially cylindrical ferrule mounted within the outlet.

In addition to facilitating the alignment of a fiber optic connector having a rectangular shape in lateral cross-section with a substantially cylindrical ferrule 14, the outlet assembly 40 of this aspect of the present invention further improves the alignment accuracy of the optical fibers upon which the respective ferrules are mounted. In this regard, the alignment of the outlet housing 42 and the ferrule is primarily based upon the engagement of the alignment members 50 and the exterior surface of the substantially cylindrical ferrule. In particular, the alignment of the outlet housing and the substantially cylindrical ferrule is based upon the engagement of the alignment members of the outlet with the alignment grooves 14b defied by the exterior surface of the ferrule. As described above, the exterior surface of the substantially cylindrical ferrule, such as a DC or QC ferrule, typically serves as the polishing datum and is therefore precisely defined with respect to the positions of the optical fibers at the forward end 14a of the ferrule. As such, the outlet assembly of this aspect of the present invention should provide improved alignment accuracy between the optical fibers terminated by the substantially cylindrical ferrule and the rectangularly-shaped fiber optic connector that is inserted into the passageway defined by the first portion 42a of the outlet housing. This improved alignment accuracy is particularly important in those applications in which the ferrules are mounted upon multiple single mode fibers which must be positioned and aligned in an extremely precise manner.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A gender selectable fiber optic connector comprising:
   a housing;
   a ferrule operably connected to said housing, said ferrule including a forward portion that extends beyond said housing and that defines at least one lengthwise extending alignment groove; and
   a shroud defining a passageway therethrough, said shroud being adapted to be mounted upon the forward portion of said ferrule such that the forward portion of said ferrule extends through the passageway, said shroud being selected from the group consisting of shrouds having a male configuration and shrouds having a female configuration, wherein the male configuration of said shroud includes at least one guide pin extending lengthwise through the passageway for engaging the respective alignment groove defined by said ferrule to produce a male fiber optic connector, and wherein the female configuration of said shroud is free of guide pins so as to produce a female fiber optic connector.

2. A gender selectable fiber optic connector according to claim 1 wherein said shroud comprises a shroud body defining the passageway therethrough, and wherein the at least one guide pin of the male configuration of said shroud is partially embedded within the shroud body and extends beyond at least one end of the shroud body.

3. A gender selectable fiber optic connector according to claim 1 wherein said ferrule defines at least two lengthwise extending alignment grooves, and wherein the male configuration of said shroud includes at least two guide pins extending lengthwise through the passageway for engaging respective alignment grooves.

4. A gender selectable fiber optic connector according to claim 1 wherein said shroud includes an outwardly extending alignment key.

5. A gender selectable fiber optic connector according to claim 1 wherein said ferrule and the passageway defined by said shroud are both substantially circular in lateral cross-section, and wherein at least a portion of an exterior surface of said shroud is rectangular in lateral cross-section.

6. A gender selectable fiber optic connector according to claim 1 wherein the male configuration of said shroud comprises:
   a shroud body defining a lengthwise extending passageway therethrough;
   a pin carrier adapted to be mounted upon said ferrule proximate said shroud body; and
   at least one guide in connected to said pin carrier and extending through the passageway defined by said shroud body.

7. A gender selectable fiber optic connector according to claim 6 wherein said pin carrier comprises a carrier ring which encircles said ferrule, and wherein said at least one guide pin comprises a pair of guide pins connected to said carrier pin and extending through the passageway defined by said shroud body.

8. A gender selectable fiber optic connector according to claim 1 wherein said housing comprises a latch.

9. A shroud for mounting upon a forward portion of a cylindrical ferrule, the shroud comprising:
   a shroud body defining a lengthwise extending passageway; and
   at least one guide pin partially embedded within said shroud body and extending lengthwise through the passageway defined by said shroud body, said at least one guide pin also extending beyond at least one end of said shroud body,
   wherein the passageway defined by said shroud body has a substantially circular shape in lateral cross-section, and wherein at least a portion of an exterior surface of said shroud body has a rectangular shape in lateral cross-section such that the shroud can adapt the ferrule of a first type of fiber optic connector for use with a second type of fiber optic connector.

10. A shroud according to claim 9 wherein said shroud body comprises an outwardly extending alignment key.

11. A shroud according to claim 9 wherein said at least one guide pin comprises a pair of guide pins extending lengthwise through the passageway defined by said shroud body in a diametrically opposed positional relationship.

12. A method for fabricating a gender selectable fiber optic connector comprising the steps of:
   providing a multi-fiber ferrule having an exterior surface which defines at least one lengthwise extending alignment groove;
   mounting the ferrule upon a plurality of optical fibers such that end portions of the optical fibers are exposed at a forward end of the ferrule;
   polishing the forward end of the ferrule and the exposed end portions of the optical fibers;
   selecting a shroud defining a lengthwise extending passageway for mounting upon the ferrule following said polishing step, said selecting step comprising selecting the shroud from the group consisting of shrouds having a male configuration and shrouds having a female configuration, wherein the male shroud configuration includes at least one guide pin extending lengthwise through the passageway for engaging the respective alignment groove defined by the ferrule, and wherein the female shroud configuration is free of guide pins; and
   mounting the selected shroud upon the ferrule such that the ferrule extends through the passageway defined by the shroud in order to produce a male fiber optic connector if a male shroud configuration is selected and a female fiber optic connector if a female shroud configuration is selected.

13. A method according to claim 12 wherein said selecting and mounting steps are performed during field installation of the fiber optic connector.

14. A method according to claim 12 wherein said providing, mounting and polishing steps are performed during factory assembly of the fiber optic connector.

15. A method according to claim 12 wherein said polishing step comprises referencing the exterior surface of said ferrule as a polishing datum.

16. A method according to claim 12 further comprising the step of mounting the ferrule at least partially within a housing prior to mounting the ferrule upon the plurality of optical fibers, wherein the ferrule is mounted at least partially within the housing such that a rear portion of the ferrule is disposed within the housing and a forward portion of the ferrule extends beyond the housing.

* * * * *